United States Patent [19]

Nelson

[11] 4,316,622
[45] Feb. 23, 1982

[54] ACCUMULATOR FILTER AND CONDUIT CLAMP ASSEMBLY

[75] Inventor: John F. Nelson, New Lenox, Ill.

[73] Assignee: Illinois Tool Works Inc., Chicago, Ill.

[21] Appl. No.: 181,499

[22] Filed: Aug. 26, 1980

[51] Int. Cl.³ .............................................. F16L 41/00
[52] U.S. Cl. ..................................... 285/119; 285/197; 285/DIG. 22
[58] Field of Search ................ 285/197, 198, 199, 419, 285/373, DIG. 22, 119; 138/99

[56] References Cited

U.S. PATENT DOCUMENTS

| D. 207,524 | 4/1967 | Terwilliger | 285/197 X |
| 2,946,518 | 7/1960 | Wahlin | 285/197 X |
| 3,229,998 | 1/1966 | Pennington | 285/419 |
| 3,456,965 | 7/1969 | Gajewski et al. | 285/419 X |
| 3,711,632 | 1/1973 | Ghirardi | 285/419 X |
| 3,776,579 | 12/1973 | Gale | 285/373 X |
| 4,043,333 | 8/1977 | Munsch | 285/197 X |
| 4,241,727 | 12/1980 | Toti | 138/99 X |

FOREIGN PATENT DOCUMENTS

| 1486484 | 5/1967 | France | 285/197 |
| 1559036 | 1/1969 | France | 285/197 |

Primary Examiner—Thomas F. Callaghan
Attorney, Agent, or Firm—Jerold M. Forsberg; T. W. Buckman; Jack R. Halvorsen

[57] ABSTRACT

There is disclosed an accumulator filter and conduit clamp assembly of the type to be applied to an apertured conduit. The assembly includes a filter unit and a conduit clamp integrally joined to the filter unit. The conduit clamp includes a pair of relatively rigid arms having inner surfaces contoured in general correspondence to the outer transverse dimension of the conduit, resilient hinge means joining the inner ends of the arms together including an arcuate inwardly projecting portion arranged to engage and exert a compressive force against the outer surface of the conduit, and latch means at the free ends of the arms for locking the free ends together. A projection extends inwardly from one of the arms and is dimensioned for being received by the conduit aperture. The projection includes a through aperture for communicating the filter unit with the conduit.

11 Claims, 6 Drawing Figures

ACCUMULATOR FILTER AND CONDUIT CLAMP ASSEMBLY

BACKGROUND OF THE INVENTION

The present invention is directed to an accumulator filter and conduit clamp assembly and more particularly to a clamp having a pair of clamping arms for engaging a conduit and a new and improved hinge formation which permits the arms to engage the conduit in broad surface contact and which also exerts a compressive force against the conduit to maintain a secure and rattle-free connection between the clamp and conduit.

There are many applications where clamps are required to establish a secure connection to the outer surface of a hose or conduit. Clamps of this type have taken many forms. In one form, the clamp is formed from metal having one or more inwardly projecting tongues arranged to engage the outer surface of the conduit to which the clamp is applied. These tongues are provided to account for dimensional tolerances in the hose and clamp and to exert a compressive force against the hose in an effort to maintain a secure connection between the clamp and hose. Unfortunately, because the tongues are formed from metal, they lose their resiliency after a passage of time and no longer are able to maintain the compressive force. As a result, such clamps eventually become loose and exhibit a tendency to rattle against the conduit in the presence of vibration.

Furthermore, because the tongues are metal, they are relatively rigid. Use of such clamps on hoses made from many thin-walled or plastic materials must be avoided because the tongues can puncture the walls of such conduits.

One application for a hose clamp is in the airconditioning system of an automobile. Here, an accumulator filter is enclosed within a coolant reservoir which contains a quantity of lubricating oil. The filter is carried by the clamp and is clamped to a conduit which carries vaporized coolant. In order to lubricate the system, the oil is carried within the same conduit to the system moving parts. The conduit is provided with a small metering aperture through which the lubricating oil passes into the conduit. The accumulator filter also includes an apertured cylindrical projection which extends from the filter and through the conduit aperture. As a result, the accumulator filter is permitted to filter the lubricating oil flowing into the conduit.

In this application a secure connection between the filter and the conduit is an absolute necessity. Should the filter and clamp become loose, it could rattle under vibration. Also, the filter projection could be dislodged from the conduit aperture permitting unfiltered lubricant to enter the conduit.

Obviously, either above noted occurrence is undesirable especially in view of the fact that the filter and clamp are enclosed within a sealed reservoir. Repair of the connection between the clamp and conduit would therefore require the breaking of the reservoir seal or replacement of the entire reservoir. Of course, either expedient is undesirable. In the former, re-establishment of the seal is required which is most difficult, and in the latter, considerable expense would be entailed.

It is therefore a general object of the present invention to provide a new and improved accumulator filter and conduit clamp assembly.

It is a further object of the present invention to provide a clamp which maintains a secure connection to a conduit notwithstanding the passage of time.

It is a further object of the present invention to provide such a clamp which applies a compressive force to the conduit but which does not puncture or otherwise damage the conduit.

SUMMARY OF THE INVENTION

The present invention therefore provides a clamp for establishing a secure connection to a conduit or the like. The clamp includes a pair of relatively rigid arms having inner surfaces contoured in correspondence to the outer transverse dimension of the conduit, inner ends, and outer free ends. The clamp further includes resilient hinge means joining the inner ends of the arms with the hinge means being inwardly projecting for engaging the outer surface of the conduit during the establishment of the secure connection between the clamp and the conduit. The clamp further includes means for locking the free ends of the arms together. The hinge means is arranged to exert a controlled continuous compressive force against the outer surface of the conduit for maintaining the secure connection between the clamp and the conduit.

The present invention also provides an accumulator filter of the type to be applied to an apertured conduit. The accumulator filter includes a filter unit and a conduit clamp joined to the filter unit. The conduit clamp includes a pair of relatively rigid arms having inner ends and free ends and inner surfaces contoured in general correspondence to the outer transverse dimension of the conduit. The clamp further includes resilient hinge means joining the inner ends of the arms together including an integral inwardly projecting portion arranged to engage and exert a compressive force against the outer surface of the conduit and latch means at the free ends of the arms for locking the free ends together. A projection extends inwardly from one of the arms and is dimensioned for being received by the conduit aperture. The projection includes a through aperture for communicating the filter unit with the conduit.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

DESCRIPTION OF THE PREFERRED EMBODIMENT

Figure 1:
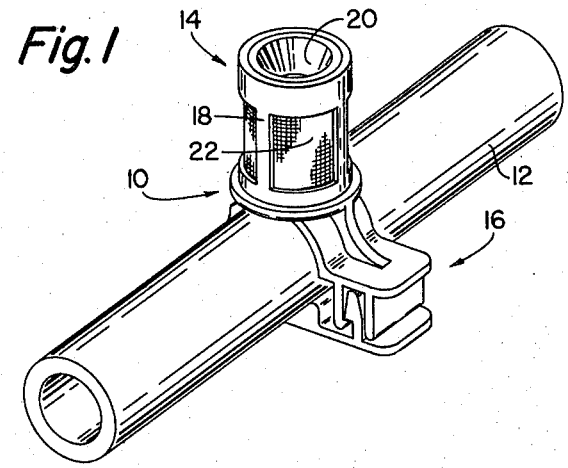
FIGS. 1 and 2 are perspective views of an accumulator filter and conduit clamp assembly embodying the present invention shown securely connected to an apertured conduit.
Figure 2:
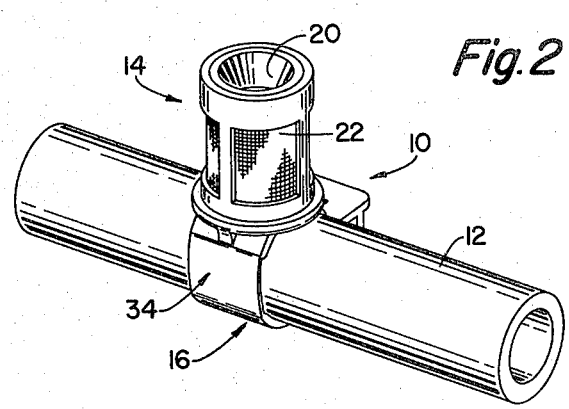

Referring now to FIGS. 1 and 2, an accumulator filter and conduit clamp assembly (10) embodying the present invention is there shown in secured connection to an apertured conduit (12). The assembly (10) is preferably a substantially one-piece thermal plastically molded product which can be fabricated from nylon or other similar materials with the capacity of being rigid when formed in heavy sections and resilient when formed in thinner sections. The assembly basically includes a filter unit (14) and a conduit clamp (16).

The filter unit (14) includes a generally cylindrical filter support frame (18), a press fitted end cap (20), and a filter mesh (22). The mesh (22) is preferably plastic mesh or cloth and is of suitable plastic material to enable the mesh (22) to be loaded into the suitable mold for molding the support frame (18) about the filter mesh (22) during the formation of the accumulator filter and conduit clamp assembly (10).

Figure 3:
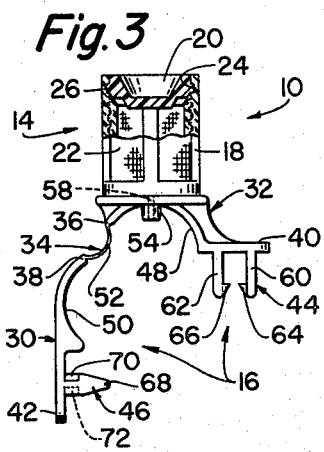
FIG. 3 is a side plan view of the accumulator filter and conduit clamp assembly of FIGS. 1 and 2 shown in its free state condition prior to assembly to an apertured conduit.

As may be seen in FIG. 3, the filter support (18) at its upper end includes a peripheral recess (24) which mates with a complimentary flange (26) carried by the cap (20). As a result, the cap (20) may be press fit into the cylindrical filter support (18) to provide a completed filter unit (14).

The conduit clamp (16) comprises a pair of relatively rigid arms (30) and (32) which are joined by a hinge means (34). The hinge (34) joins the near ends (36) and (38) of the arms (32) and (30) together. At the outer or free ends (40) and (42) the arms include a latch means in the form of a female latch portion (44) and a male latch portion (46).

As will be noted in FIG. 3, the transverse dimension of the arms (30) and (32) is relatively thick as compared to the thin wall section of the hinge (34) rendering the arms (30) and (32) relatively rigid. The arms (32) and (30) also include inner surface portions (48) and (50) which are contoured in general correspondence to the transverse dimension or outer surface of the apertured conduit (12).

The hinge (34) is inwardly projecting relative to the outwardly curved surfaces (48) and (50). More specifically, the hinge (34) is continuously inwardly arcuate in formation from the inner end (36) of arm (32) to the inner end (38) of arm (30). As will be described more fully hereinafter, as the arms (30) and (32) are brought together about the conduit (12), the hinge inwardly projecting portion (52) engages the outer wall of the conduit (12) to take up or absorb dimensional tolerances in the conduit (12) or clamp. Once the clamp (16) is securely connected to the conduit (12) in locked relation, the projecting portion (52) of the hinge (34) continues to exert a resilient compressive force against the conduit (12) to maintain secure connection between the clamp and conduit.

The arm (32) of the clamp (16) integrally carries the filter unit (14). A projection (54) projects inwardly from the arm (32) and is dimensioned for being received by the aperture (56) (FIG. 5) of the conduit (12). The projection includes a through aperture (58) which provides communication between the filter unit (14) and the interior of the conduit (12). It will also be noted that the projection (54) is midway between the hinge (34) and the latches (44) and (46) when the latter are interlockingly engaged about the conduit (12).

The female latch portion (44) includes a pair of substantially parallel walls (60) and (62). The walls include inwardly projecting tines (64) and (66) which are offset with respect to one another. In a complimentary fashion, the male latch portion (46) includes a tapered nose portion (68) which serves to guide the male latch portion (46) between the tines (64) and (66) and between the parallel walls (60) and (62). The latch (46) includes a pair of recesses (70) and (72) which are also offset to one another so that the tine (64) will enter the recess (72) and the tine (66) will enter the recess (70) upon the interlocking engagement of the latches (44) and (46).

Figure 5:
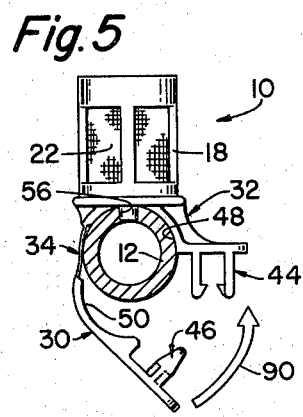
FIG. 5 is a side plan view similar to FIG. 3 but partly in cross-section and illustrating the manner in which the accumulator filter and conduit clamp assembly embodying the present invention is applied to the apertured conduit.

Refering now to FIG. 5, it can there be seen that the accumulator filter and conduit clamp assembly (10) is being applied to a conduit (12) having the aperture (56). Hence it may be noted that the inner surface (48) of arm (32) is contoured in correspondence to the outer dimension of the conduit (12). It will also be noted that as the arm (30) is moved in the direction of the arrow (90), the hinge (34) is deformed to resiliently take the shape of the outer dimension of the conduit (12). Upon further displacement of the arm (30), the latches (44) and (46) will lockingly engage until they are fully locked as seen in FIG. 6.

Figure 6:
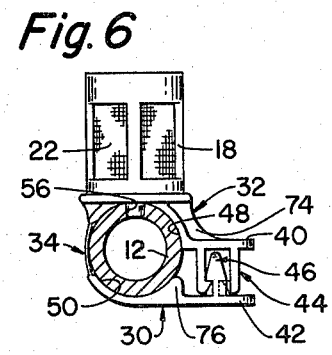
FIG. 6 is a side plan view partly in cross-section similar to FIG. 5 showing the assembly in locked and fully assembled relation on the apertured conduit.
Figure 4:
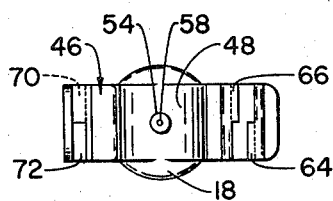
FIG. 4 is a bottom plan view of the assembly of FIG. 3.

As may be noted in FIG. 6, the latches (44) and (46) are interlocked on the side of the conduit (12) which is diametrically opposed to the hinge (34). The hinge (34) has taken the contour of the conduit (12) but, since it is formed from resilient material, continues to exert a clamping or compressive force against the conduit (12).

To reinforce the latches (44) and (46), the arm (30) is provided with a thickened portion (76) adjacent the latch (46) at the free end (42). Similarly, the arm (32) is provided with a rib (74) adjacent the free end (40). The rib (74) and thickened portion (76) serve to reinforce the latches (44) and (46) and the arms (32) and (30) against the compressive force exerted on the conduit (12) by the hinge (34).

From the foregoing, it will be appreciated that the present invention provides a new and improved accumulator filter and conduit clamp assembly. Because the clamp includes the inwardly projecting hinge (34) which is formed from a thin wall section or webbing of the plastic, the clamp (16) will not puncture or otherwise damage a conduit to which it is applied. The hinge (34) will at all times exert a controlled and uniform compressive force against the conduit (12). This assures a secure connection between the clamp and conduit notwithstanding the passage of time and further precludes rattling between the clamp and conduit.

While a particular embodiment of the present invention has been shown and described, modifications may be made, and it is therefore intended to cover in the appended claims all such changes and modifications which fall within the true spirit and scope of the invention as defined by said claims.

I claim:

1. A one piece plastic clamp for establishing a secure connection to a conduit or the like comprising a pair or relatively rigid arms having generally concave inner surfaces contoured to be substantially complimentary to the outer transverse dimension of the conduit, said arms having inner ends and outer free ends; a relatively thin resilient hinge means joining the inner ends of said arms, said hinge means being initially generally arcuate in formation between said inner ends of said arms and projecting inwardly to present a deformable generally convex surface for engaging the outer surface of the conduit during the establishment of the secure connection between the clamp and the conduit; and integral means for locking the free ends of said arms together, said hinge means being arranged to exert a controlled continuous compressive force against the outer surface of the conduit for maintaining said secure connection between said clamp and the conduit.

2. A clamp as defined in claim 1 wherein at least one of said arms includes an outer transverse rib adjacent said means for locking the free ends of said arms together.

3. A clamp as defined in claim 1 wherein said arms include reinforcing means arranged to be disposed on the side of the conduit opposite said hinge means when said clamp is secured to the conduit for reinforcing said arms against the compressive pressure applied by said hinge means.

4. A clamp as defined in claim 1 wherein said locking means includes integral latch means at said free ends of said arms arranged to interlock on the side of the conduit generally opposed to said hinge means.

5. A clamp as defined in claim 4 wherein each said arm further includes reinforcing means adjacent said free ends for reinforcing said integral latch means against the compressive forces exerted by said hinge means.

6. A plastic accumulator filter of the type to be applied to an apertured conduit comprising: a filter unit; a conduit clamp integrally joined to said filter unit, said conduit clamp including a pair of relatively rigid arms having inner surfaces contoured in concave fashion to be generally complimentary to the outer transverse dimension of the conduit, resilient hinge means integrally joining said inner ends of said arms together including an initially inwardly projecting portion having a distortable convex surface arranged to engage and exert a compressive force against the outer surface of the conduit, and integral latch means at said free ends of said arms for locking said free ends together, and a projection extending inwardly from the inner surface of one of said arms, said projection dimensioned for being received by the conduit aperture and including a through aperture for communicating said filter unit with the conduit.

7. An accumulator filter as defined in claim 6 wherein said latch means at said free ends of said arms are arranged to interlock on the side of the conduit diametrically opposed to said hinge means.

8. An accumulator filter as defined in claim 7 wherein each said arm further includes reinforcing means adjacent said free ends for reinforcing said latch means against the compressive forces exerted by said hinge means.

9. An accumulator filter as defined in claim 6 wherein said inwardly projecting portion of said hinge means is continuously inwardly arcuate between said inner ends of said arms.

10. An accumulator filter as defined in claim 9 wherein said filter unit and said conduit clamp are formed from moldable plastic material, wherein said arms are relatively thick in transverse dimension, and wherein said hinge means is thinner in transverse dimension than said arms.

11. An accumulator filter as defined in claim 7 wherein said projection carried by said one arm is approximately mid-way between said hinge means and said latch means when said latch means are interlocked.

* * * * *